Figure 1:
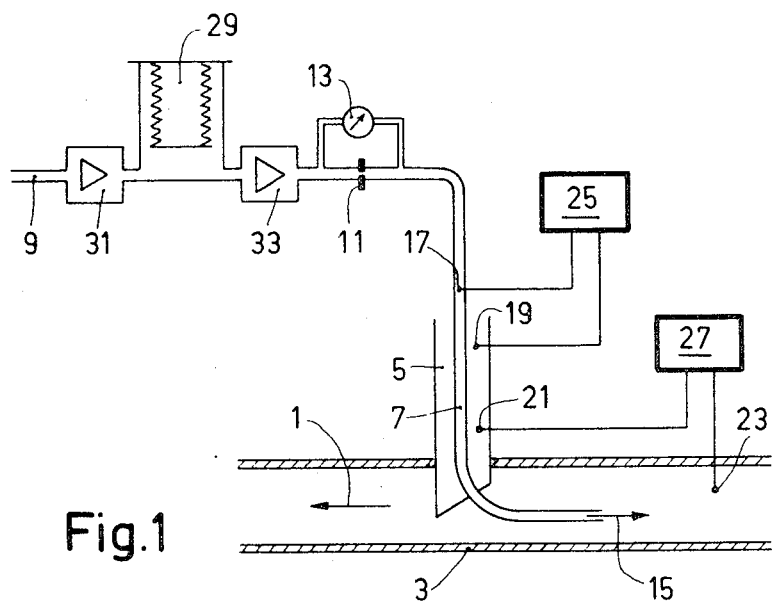

United States Patent [19]
Auphan et al.

[11] 3,733,899
[45] May 22, 1973

[54] DEVICE FOR MEASURING THE FLOW RATE OF A LIQUID

[75] Inventors: Michel Joseph Auphan, Courbevoie; Jean Robert Perilhou, Bourg-la-Reine, both of France

[73] Assignee: U.S. Philips Corporation, New York, N.Y.

[22] Filed: May 17, 1971

[21] Appl. No.: 144,008

[30] Foreign Application Priority Data

May 25, 1970 France..................................7018962

[52] U.S. Cl..................................................73/204
[51] Int. Cl. ........................A61b 5/02, G01p 5/10
[58] Field of Search ........................73/204; 128/2.05

[56] References Cited

UNITED STATES PATENTS

| | | |
|---|---|---|
| 2,799,165 | 7/1957 | Varvel..................................73/204 |
| 2,603,089 | 7/1952 | Morley et al. ..........................73/204 |
| 3,399,566 | 9/1968 | Brown....................................73/204 |
| 3,446,073 | 5/1969 | Auphan et al..........................73/204 |

*Primary Examiner*—Herbert Goldstein
*Attorney*—Frank R. Trifari

[57] ABSTRACT

An improved device for regulating the flow of liquid through a conduit is described. The device is particularly useful in the regulation of blood flowing through a blood vessel. Unlike previous devices of this type the device described herein is readily usable on blood vessels situated well below the skin. The device comprises an injection duct for an auxiliary liquid which is mixable with the flowing liquid and thermocouples for measuring temperature differences, characterized in that the device is provided with means for the pulsating supply of the auxiliary liquid.

2 Claims, 2 Drawing Figures

PATENTED MAY 22 1973
3,733,899

INVENTORS
MICHEL J. AUPHAN
JEAN R. PERILHOU
BY
*Frank R Trifau*
AGENT

DEVICE FOR MEASURING THE FLOW RATE OF A LIQUID

The invention relates to a device for measuring the flow rate of a liquid flowing through a duct. Specifically, the device has an injection duct for, an auxiliary liquid which is mixed with the flowing liquid and thermocouples for measuring temperature differences.

Such a device is known from the French patent of addition No. 92,750. According to this patent of addition, the flow rate of, for example, blood flowing through a blood vessel is measured by injecting an auxiliary liquid, into the flood vessel at a known rate. The temperature of the auxiliary liquid is different from that of the blood. In order not to disturb the flow of blood, a quantity of the mixture of blood and auxiliary liquid is at the same time withdrawn from the blood vessel. The quantities of injected liquid and withdrawn mixture per unit of time are maintained as equal as possible. The known device is provided with thermocouples for measuring the temperature differences between the blood, the auxiliary liquid and the mixture of blood and auxiliary liquid. These thermocouples are arranged in suitable places near the injection duct and the duct for withdrawing liquid from the blood vessel.

If the liquid is withdrawn downstream from the injection point, the flow rate D of the blood is defined by the formula:

$$D = d \cdot (T_2 - T_1/T_3 - T_2) \text{ where}$$

$T_1$ is the temperature of the auxiliary liquid
$T_2$ is the temperature of the mixture
$T_3$ is the temperature of the blood,
$d$ is the rate at which the auxiliary liquid is injected.

In some cases additional steps are required in order to obtain proper mixing of the flowing liquid and the auxiliary liquid. In the patent of addition such a step is accomplished by of a stirring device consisting of one or more magnets. The device is put into motion by a magnetic field generated outside the liquid duct. A drawback of this construction is that for poorly accessible ducts, such as blood vessels which are situated far below the skin, driving of the stirring device becomes very difficult on account of the large gap in the magnetic circuit.

The object of the invention is to provide a construction enabling proper mixing of both liquids, independent of the location of the liquid duct. In order to achieve this object the device is provided with means for the pulsating supply of the auxiliary liquid.

These means comprise a pulsating pump which is connected by an inlet valve to a supply line for the auxiliary liquid, and to the injection duct by an outlet valve.

Due to the pulsating supply of the auxiliary liquid, turbulences are produced in the vicinity of the supply point, thus greatly stimulating the mixing of both liquids.

Figure 2:
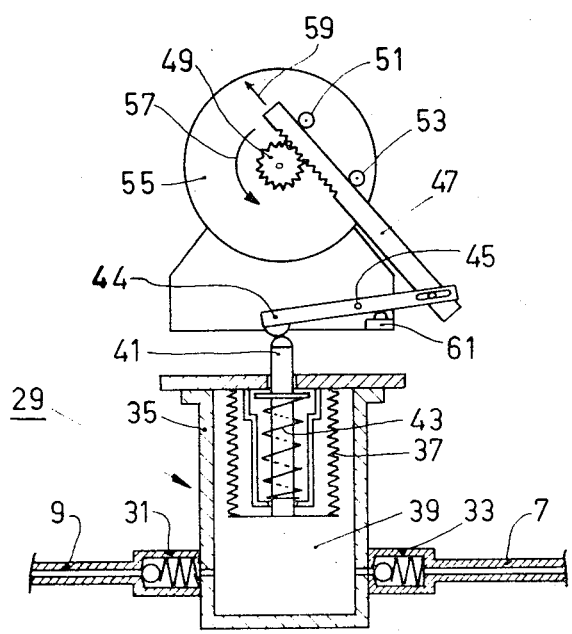

In order that the invention may be readily carried into effect, one embodiment thereof will now be described in detail, by way of example, with reference to the accompanying diagrammatic drawing, in which FIG. 1 is a diagrammatic view of a device according to the invention, FIG. 2 is a sectional view of a pulsating pump used in the device of FIG. 1.

In FIG. 1 liquid flows at an unknown rate in the direction of the arrow 1 through a tube 3. An injection duct 7 in the form of a flexible hose is inserted into the tube 3 through a hollow needle 5, protruding through the tube wall. Via this injection duct an auxiliary liquid, coming from a supply line 9, can be introduced into the tube at a rate which can be measured by means of a known flowmeter, for example, consisting of a constriction 11 provided in the injection duct, said constriction causing a pressure drop which is proportional to the flow rate of the auxiliary liquid and which can be measured by means of a pressure gauge 13.

The auxiliary liquid flows from the injection duct 7 in the direction of the arrow 15 into the tube 3 and mixes with the liquid flowing in this tube. Part of this mixture may be withdrawn by the hollow needle 5 by a suction pump not shown. Thermocouples 17, 19, 21, and 23 are provided for measuring the temperature differences. The thermocouples 17 and 19 measure the temperature $T_1$ of the auxiliary liquid and $T_2$ of the mixture, respectively. They are connected to a measuring instrument 25 which indicates the difference $T_2-T_1$. The thermocouples 21 and 23 measure the temperature $T_2$ of the mixture and $T_3$ of the flowing liquid, respectively. They are connected to a measuring instrument 27 which indicates the difference $T_3-T_2$.

In order to stimulate the mixing of the flowing liquid and the auxiliary liquid, the latter is supplied in a pulsating manner according to the invention. For this purpose the device is provided with a pulsating pump 29 which is connected by an inlet valve 31 to the supply line 9, and which is connected by an outlet valve 33 to the injection duct 7. The pulsating pump 29 (see FIG. 2) comprises a cylindrical housing 35 accommodating a bellows 37 which can be compressed in the axial direction. When the bellows 37 is compressed, the pumping space inside the housing 35 is increased so that the inlet valve 31 opens with the result that auxiliary liquid flows from the supply line 9 into the pumping space. Expansion of the bellows 37 reduces the pumping space 39, so that the discharge valve 33 opens with the result that liquid flows from the pumping space 39 into the injection duct 7. The valves 31 and 33 are preferably ball valves.

The bellows 37 can be expanded by moving a rod 41 inwards along the axis of the chamber 35. A spring 43 is then tensioned, thus ensuring that the bellows 37 resumes its original position when the axial force on the rod 41 is removed.

The rod 41 can be moved in the axial direction by means of a lever 44, which is pivotable around a shaft 45 and which is driven by a rack 47 which co-operates with a pinion 49 and which is guided by two guide rollers 51 and 53. The pinion 49 can be driven via a coupling (not shown) by an electric motor 55 so that it starts to rotate in the direction of the arrow 57. The coupling between the motor 55 and the pinion 49 is, for example, a known electro-magnetic coupling consisting of a continuously rotating disc which is connected to the motor shaft and a disc which is connected to the pinion, one of said discs comprising an electromagnet which, when energized, couples the two discs together. If the coupling is energized with a pulsating current, the pinion 49 is each time driven during a brief period, so that the rack 47 moves in the direction of the arrow 59. As a result, the lever 44 rotates anti-clockwise, so that the rod 41 is pressed into the housing 35. The bellows 37 is thus expanded and the pumping space 39 is reduced. At the end of the current pulse supplied to the coupling the pinion 49 is uncoupled again so that the force on the rod 41 is removed and the spring 43 restores the original situation. By varying the length and the frequency of the current pulses, the flow in the injection duct 7 can be influenced.

In order to prevent the coupling from receiving two current pulses in an excessively rapid succession, a switch 61 is provided which is operated by the lever 44 and which is closed only when the lever is in the rest position. The switch 61 is incorporated in the current supply circuit for the coupling and ensures that a new current pulse can be given only when the lever 44 is in the rest position again.

What is claimed is:

1. A device for measuring the flow rate of liquid flowing through a channel comprising a hollow needle arranged for insertion into said channel, an injection duct carried within said needle and extending into said channel, a supply of auxiliary liquid at a temperature different from the temperature of the liquid flowing in said channel connected to said duct so that said auxiliary liquid will enter said channel, means connected to said supply means for pulsing said auxiliary liquid into said injection duct so that said liquid enters said channel in pulses so as to thoroughly mix with the liquid flowing in said channel, a first temperature sensitive element arranged for sensing the temperature of said auxiliary liquid, a second temperature sensitive element arranged for sensing the temperature of said mixture of liquids, a third temperature sensitive element for sensing the temperature of the liquid flowing in said channel, and means connected to said temperature sensitive elements for measuring the difference between said first and second temperatures and the difference between said second and third temperatures.

2. The device as claimed in claim 1 wherein said means for pulsing said liquid comprises a pulsating pump connected at one side to an inlet valve which is connected to said supply of auxiliary liquid, and said pump being connected at its other side to an outlet valve which is connected to said injection duct.

* * * * *